United States Patent [19]

Young et al.

[11] Patent Number: 4,783,046
[45] Date of Patent: Nov. 8, 1988

[54] PNEUMATIC VALVE ACTUATORS

[75] Inventors: Terry G. Young; Neil H. Akkerman, both of Houston, Tex.

[73] Assignee: AVA International Corporation, Houston, Tex.

[21] Appl. No.: 42,422

[22] Filed: Apr. 24, 1987

[51] Int. Cl.$^4$ .................................... F16K 31/126
[52] U.S. Cl. ..................................... 251/61.4; 251/61
[58] Field of Search ..................... 251/614, 61.5, 61

[56] References Cited

U.S. PATENT DOCUMENTS

| | | |
|---|---|---|
| 585,711 | 7/1897 | Smith . |
| 826,637 | 7/1906 | Wilkins . |
| 1,619,866 | 3/1927 | Hoeschen . |
| 2,208,539 | 7/1940 | Brown . |
| 2,241,324 | 5/1941 | Selby . |
| 2,638,124 | 5/1953 | Nickerson . |
| 2,678,662 | 5/1954 | Boteler .......................... 251/61 X |
| 2,882,007 | 4/1959 | Conlan . |
| 3,120,856 | 2/1964 | McIntosh . |
| 3,624,802 | 11/1971 | Ripert . |
| 3,767,160 | 10/1973 | McCollum . |
| 3,967,809 | 7/1976 | Skantar . |
| 3,982,400 | 9/1976 | Benkert . |
| 4,048,265 | 9/1977 | Fordyce et al. . |
| 4,111,221 | 9/1978 | Olsen . |
| 4,378,932 | 4/1983 | Avery . |
| 4,488,473 | 12/1984 | Gammon . |

Primary Examiner—Arnold Rosenthal
Attorney, Agent, or Firm—Vaden, Eickenroht, Thompson & Boulware

[57] ABSTRACT

There is disclosed a pneumatic gate valve actuator adapted to move the gate of the valve between opened and closed position by the introduction of air pressure into or the exhaustion of air pressure from an expandable and contractible pressure chamber formed within a tire casing and between upper and lower plates having their peripheries connected to inner edges of a tire casing. The lower plate is connected to the stem for the gate, the upper plate is connected to the bonnet of the actuator, and a coil spring is compressed between the lower plate and the bonnet, so that the gate may be moved to open position upon the supply of air pressure to the chamber, and moved to closed position upon the exhaust of air pressure from the pressure chamber.

10 Claims, 3 Drawing Sheets

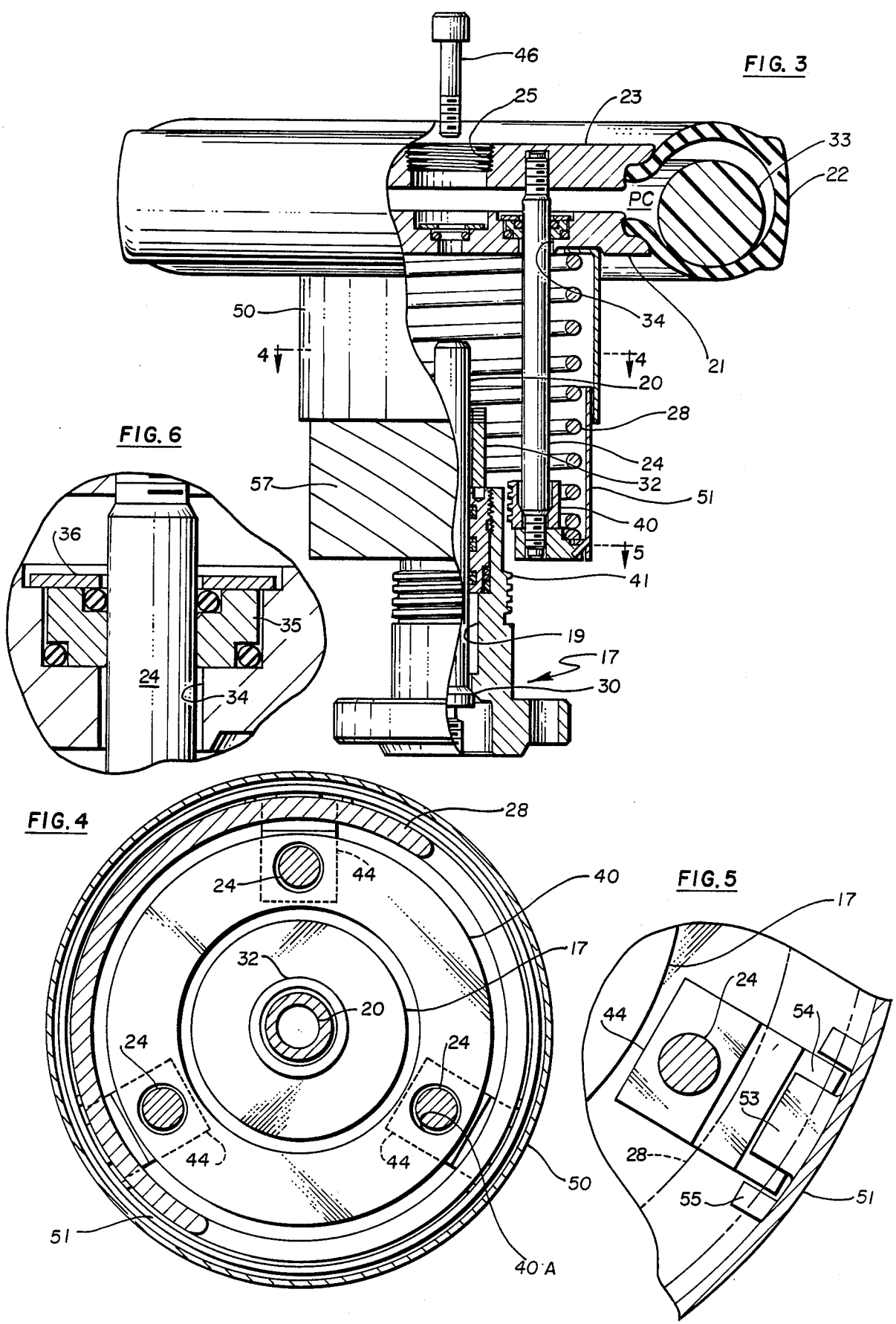

PNEUMATIC VALVE ACTUATORS

This invention relates generally to improved pneumatic valve actuators, wherein a closure member is moved to one position by the admission of air pressure to an expandable and contractible pressure chamber thereof and to its other position upon the exhaustion of air pressure therefrom. In one of its aspects, it relates to a fail safe valve or the like wherein the closure member is moved to its other position by spring means upon the exhaustion of the air pressure.

In one conventional actuator of this type, air pressure is selectively admitted to or exhausted from a pressure chamber on one side of a piston connected to a closure member and reciprocal within a cylinder mounted on the body of the valve, and spring means acts between the cylinder and the other side of the piston to move the closure member to one of the positions upon the exhaust of air pressure. In another conventional actuator of this type, air pressure is admitted to or exhausted from a pressure cylinder on one side of a diaphragm connected to the closure member and having a flexible periphery clamped between flanges of opposed bodies of a pressure vessel mounted on the body. In either case, the necessity for rigid, pressure containing walls makes the actuator expensive to manufacture as well as expensive to maintain in the event it is necessary to replace the piston seals or the flexible outer portion of the diaphragm.

The primary object of this invention is to provide an actuator of this type which does not require such rigid, pressure containing walls and which is more compact and thus less expensive to manufacture and maintain.

This and other objects are accomplished, in accordance with the illustrated embodiment of the invention, by an actuator of this type which includes a first plate adapted to be connected to the outer end of a stem which is sealably reciprocable within the valve body and whose inner end is adapted for connection to the closure member, a rubber tire casing having an inner edge connected to the first plate, and a second plate connected to the other inner edge of the tire casing to form an expandable and contractible pressure chamber within the casing and between the plates. More particularly, means are provided for connecting the second plate to the valve body, and for selectively admitting air pressure to the pressure chamber in order to move the first plate away from the second plate, and thereby move the closure member to one of its positions, or exhausting air pressure therefrom to permit the second plate to be moved toward the first plate and thus move the closure member to its other position. In accordance with one novel aspect of the invention, the second plate is connected to the valve body by rods which extend sealably through holes in the first plate, such that the valve requires no load transmitting parts surrounding or encompassing the tire casing. In accordance with another novel aspect of the invention, the closure member is adapted to be moved to its other position by spring means compressed between the first plate and valve body, whereby the valve is of compact construction requiring a minimum of head room.

The tire casing not only provides the actuator with the flexibility necessary to permit it to expand and contract, but also, due to its rugged construction, is capable of containing the air pressure normally required to operate such valves without the need for rigid, pressure containing walls making up the pressure chambers of prior actuators of this type. Preferably, the tire casing flexes between a position in which its inner edges are relatively close together, when the valve is in one position, and a substantially unstressed condition in which they are spaced further apart when the valve is in its other position, so that the force required to move the closure member to its other position, due to the admission of air pressure to the pressure chamber, is minimized by virtue of the normal tendency of the tire to return toward its unstressed position, and the air pressure acts over a maximum cross sectional area of the pressure chamber, namely, that bounded by substantially the radial mid point of the tire.

Although the invention contemplates the use of readily available, suitably radially reinforced tire casings normally used for vehicles, it nevertheless anticipates the use of a tire casing manufactured for this specific purpose, and having the ability of existing tire casings to expand and contract without losing its inherent radial shape.

In the drawings, wherein like reference numbers are used throughout to indicate like parts:

FIG. 3 is a vertical sectional view of the actuator of the valve as it is being installed upon or removed from the bonnet of the valve body;

FIG. 4 is a cross sectional view of the actuator as seen along broken line 4—4 of FIG. 3.; and FIG. 5 is an enlarged, detailed view of a portion of the actuator, as seen along broken line 5—5 of FIG. 3; and FIG. 6 is an enlarged, detailed view of a seal ring through which each of the rods extends.

Figure 1:
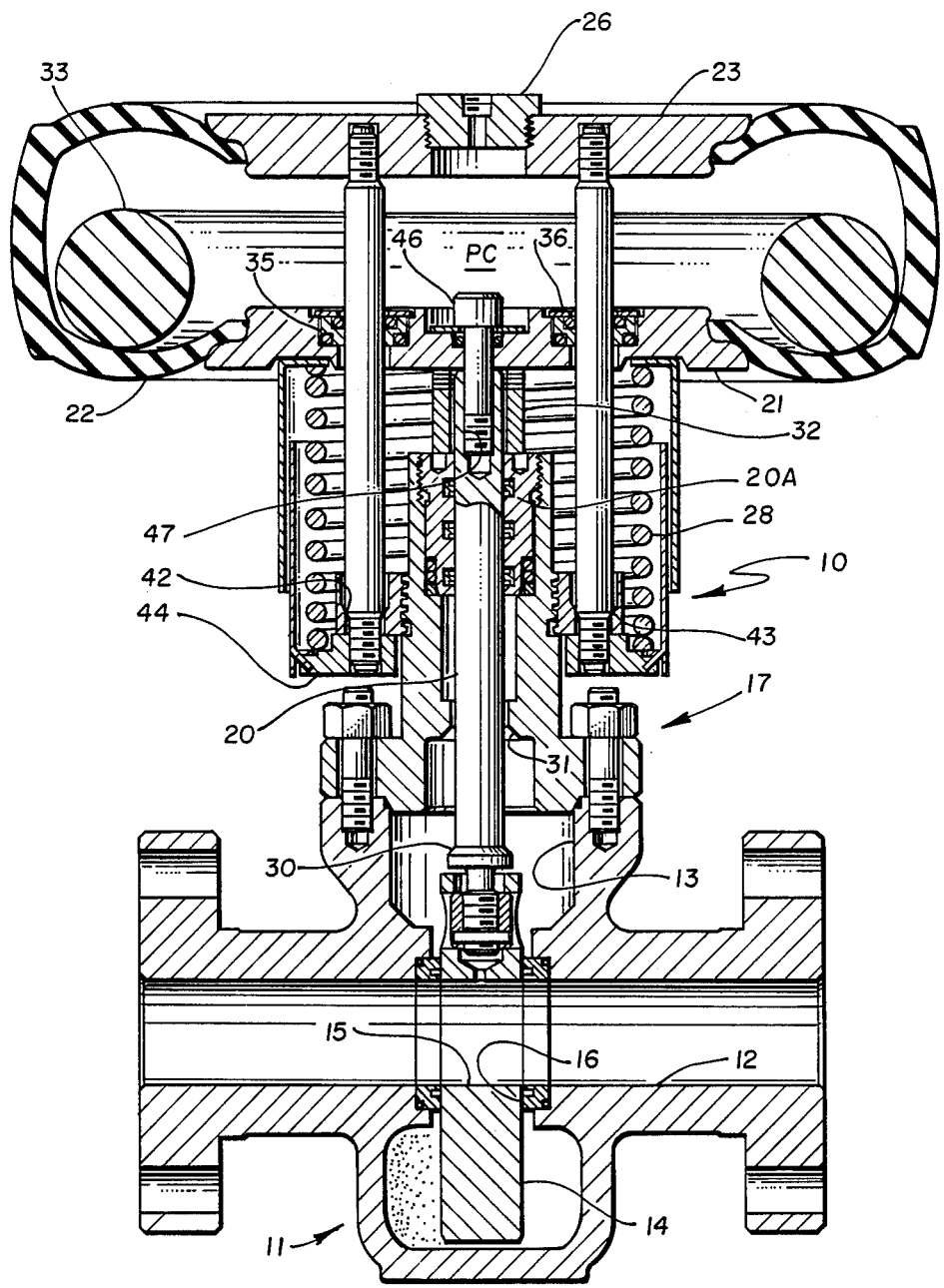
FIG. 1 is a vertical sectional view of a gate valve constructed in accordance with the present invention and with its pressure chamber expanded by air pressure to lower the gate to open position.
Figure 2:
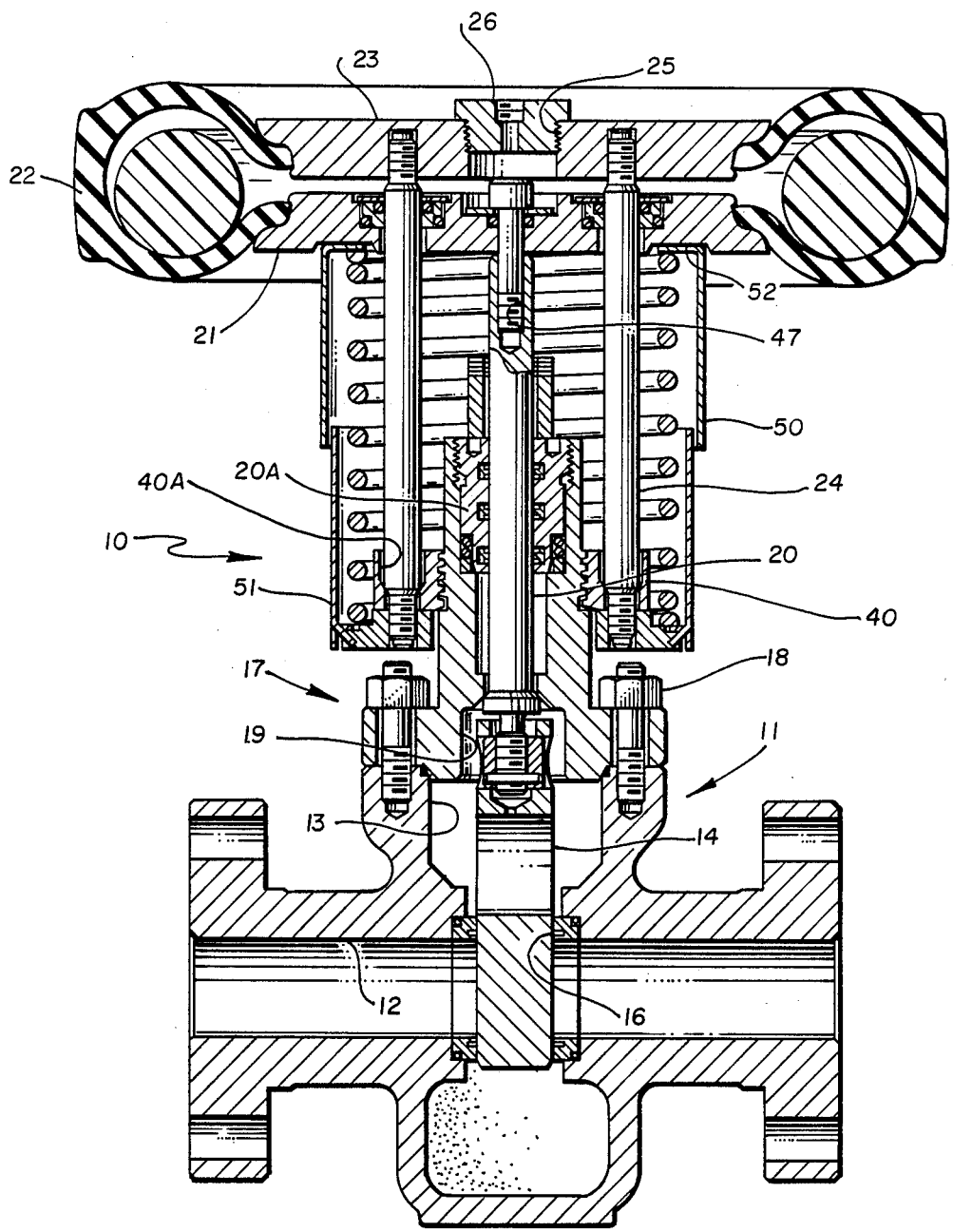
FIG. 2 is a view of the valve similar to FIG. 1, but upon the exhaustion of air pressure from the pressure chamber to permit the gate to be raised to closed position.

With reference to the details of the above-described drawings, the valve, which is indicated in its entirety by reference character 10, is shown to comprise a valve body including a housing 11 having a flowway 12 therethrough and means such as flanges on its opposite ends for connecting the valve in a pipeline or the like with its flowway forming a continuation of the pipe line. The housing has a cavity 13 therein which intersects the flowway to receive a gate 14 having a through conduit 15 therein and adapted to be moved between a lower position (FIG. 1) in which the conduit 15 forms a continuation of the flowway 12 to open the valve, and an upper position (FIG. 2) in which the conduit 15 is raised above the flowway and a solid lower portion of the gate is disposed thereacross to close the valve. Seats 16 are carried within recesses in each side of the cavity 13 for sealably engaging opposite sides of the gate in its opened and closed positions.

The valve body also includes a bonnet 17 adapted to be connected by bolts 18 to the upper end of the housing above the cavity 13, and having an opening 19 therein aligned with the cavity to receive a stem 20 having its lower end releasably connected to the upper end of the gate 14 and adapted to reciprocate vertically within the opening and cavity in order to move the gate between its opened and closed positions. The upper end of the stem 20 extends from the upper end of the bonnet opening and is surrounded by a seal assembly 20A threadedly connected to an enlarged diameter portion of the bonnet opening so as to form a sliding seal with the stem and thus contain pressure within the valve.

The actuator includes a lower plate 21 connected to the upper end of the stem and having its periphery connected to the inner lower edge of a tire casing 22. The upper inner edge of the tire casing 22 is connected to the periphery of an upper plate 23, and the upper plate is in turn connected to the bonnet 17 by means of rods 24. More particularly, there are three equally spaced rods which extend sealably through holes in the lower plate and are connected at their lower ends to the bonnet above the bolts 18. Thus, an expandable and contractible air chamber PC is formed between the plates and within the tire casing 22 to which air pressure may be selectively admitted or from which it may be exhausted through a fitting 26 closing a hole 25 in the upper plate 23.

A coil spring 28 is disposed about the rods 24 and compressed between the lower plate 21 and the connection of the lower ends of the rods to the bonnet so as to yieldably urge the lower plate upwardly toward the upper plate. Thus, upon the exhaustion of air pressure from the pressure chamber, spring 28 raises the lower plate to move the gate to closed position. Upon the supply of air pressure to the chamber PC, the lower plate is forced downward to compress the spring 28 and thus move the gate to its open position as the tire returns to its normally unstressed position.

The valve is located in the closed position by the engagement of a shoulder 30 about the stem with a seat 31 formed in the bonnet at the lower end of the opening 19 for the stem. More particularly, these shoulders are of the same conical shape so as to permit the stem to "back seat" and form a seal with the bonnet in order to permit the actuator or seal assembly 20A carried within the bonnet opening to be replaced while the valve is in use. The valve is located in its open position by the engagement of the lower side of the lower plate 21 with the upper end of a spacer sleeve 32 carried about the stem above the bonnet and adapted to support one or more shims on its upper end to permit adjustment of the lower, open position of the gate.

As shown, the inner edges of the tire casing have beads which fit closely within grooves in the peripheries of the plates to form a sealed connection between them as the tire casing flexes, as in the case of the air tight engagement of the inner edges of a tubeless tire casing with the rim of a hub when mounted on a vehicle. Obviously, however, the edges of the tires and peripheries of the plates may be sealably connected in other ways, especially if the tire casing is specially fabricated for use with the valve of this invention.

In accordance with another novel aspect of the present invention, a ring 33 of relatively light, but rigid material is contained within the tire casing so as to substantially reduce the volume of the pressure chamber, and thus the volume of air which must be admitted to, or exhausted from, the chamber in order to open and close the valve. For example, the ring 33 may be made of nylon or other suitable plastic material, which, in addition to being relatively lightweight and rigid, is inert with respect to the air or other gas used to expand or contract the pressure chamber.

In accordance with a further novel aspect of the present invention, the rods 24 extend through seal assemblies carried by the lower plate 21 which are of such construction as to permit relatively large radial tolerances between the rod and the lower plate, as might occur during flexure of the tire casing, but while nevertheless maintaining a tight dynamic seal between the rod and lower plate. Thus, as shown in the detailed view of FIG. 6, the lower plate has openings 34 through which the rod extends which are enlarged at their upper ends to receive a ring 35 releasably held seated within the enlarged end of the opening by washers 36 or the like. As shown, the inner diameter fits relatively closely about the rod, and carries a seal ring within a groove in its upper inner corner to maintain a dynamic seal with the rod as it reciprocates through the lower plate. On the other hand, the outer diameter of the ring fits relatively loosely within the enlarged inner end of the hole in the lower plate, and the rod itself fits rather loosely within the outer end of the hole in the plate, thereby permitting some radial movement between the two. Another seal ring is carried within the outer lower corner of the ring, the dimensions being such as to maintain the latter ring in radial compression so as to seal between the ring and lower plate. Although the spacing between the outer diameter of the ring and hole and between the rod and hole is relatively large, the outer seal ring is sufficient to maintain the seal especially since it is not dynamic.

The ends of the rods 24 are connected to the bonnet 17 by means of a ring 40 which is internally threaded for releasable connection to threads 41 about the bonnet, and which has holes 40A therethrough, each to receive a rod 24. Each hole has a seat 42 thereabout which is engaged by a shoulder 43 about the rod, and a lower threaded end of the rod extends through the hole for connection with a nut 44 for holding the shoulder 43 on the seat 42 and thereby releasably connecting the lower ends of the rods to the ring and thus to the bonnet.

The lower end of the spring 28 is seated upon flanges which extend outwardly from the nuts so as to yieldably urge the lower plate upwardly toward the upper plate as long as the end of the spring is retained by the nuts. As shown in FIG. 3, release of the threaded connection between the ring 40 and the bonnet permits the actuator to be installed or removed as a unit. During installation or removal, air pressure would be exhausted from the chamber PC to permit the lower plate to be raised with respect to the lower plate, as shown in FIG. 3.

In accordance with a further novel aspect of the present invention, and as shown in the drawings, the nut is so located beneath the connection of ring 40 to the bonnet that the bonnet prevents the nut from being rotated as long as the ring is threadedly connected to the bonnet. This then prevents disassembly of the spring 28 before the disconnection of the actuator from the bonnet. Assembly of the actuator from the bonnet is also discouraged, except with respect to trained personnel, by the connection of the lower plate to the stem which is released only upon removal of the plug 26 to obtain access to the interior of the pressure chamber. That is, the upper end of the stem 20 is connected to the lower plate by means of a bolt 46 which extends sealably through a hole in the lower plate for threaded connection at its lower end beneath the lower plate to a threaded socket 47 in the upper end of the stem. Thus, when the bolt is fully made up with the stem, it pulls the upper end of the stem against the bottom of the lower plate as the head on the bolt engages a washer above a seal ring surrounding the bolt in a groove in the inner end of the hole. As will be appreciated, the bolt may be manipulated to release the stem only upon removal of the closure 26 to provide access to the head of the bolt. This not only serves as a further deterrent to release of the coil spring by untrained personnel, but also discourages theft or tampering with the actuator by other than trained personnel.

In accordance with a still further novel aspect of the present invention, the coil spring 28 is surrounded by a pair of sleeves 50 and 51 which are carried respectively by the lower plate and the nuts on the lower ends of the rods with their free ends being telescopically disposed of one another to prevent access to the springs without disassembly of the actuator and removal of the nuts as previously described. More particularly, the upper sleeve 50 has an inturned flange which is engaged by the upper end of the spring and located within a recess 52 in the lower side of the lower plate, and the lower sleeve 51 has tabs 53 struck from its lower end for seating upon a ledge 54 at the outer end of the flange extending from each nut and thus in a position to be engaged by the lower end of the spring 28. Preferably, and as illustrated, the lower end of the spring spans the tabs 53 and the upper side of the flange inwardly of the ledge 54. Each of the tabs 53 is aligned with respect to its nuts by means of additional tabs 55 struck from the lower end of the sleeve 51 for disposal on opposite sides of the nut, as shown in FIG. 5.

More particularly, the sleeves 50 and 51 provide a means for indicating the location of the lower plate relative to the upper plate, and thus the position of the closure member, from considerable distances away from the valve. Thus, suitable indicia such as diagonal stripes 57 are formed about the exterior sleeve 51 and thus provide a means which indicates changes in the vertical position of the sleeve 50 as the lower end of the sleeve 50 moves over the indicia 57. Obviously, other indicia may be used for this purpose.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. For use with a valve including a valve body having a flowway therethrough and a closure member reciprocable in the body between positions opening and closing the flowway, a pneumatic actuator comprising
    a stem adapted to extend sealably into the valve body and having an inner end connectable to the closure member for reciprocating it between open and closed positions,
    a first plate connected to the outer end of the stem,
    a rubber tire casing having an inner edge connected to the first plate,
    a second plate connected to the other inner edge of the casing to form an expandable and contractible pressure chamber within the casing and between the plates,
    means extending sealably through the first plate for connecting the second plate to the valve body means forming a sliding seal between the connecting means and the first plate to prevent the loss of pressure fluid from the chamber, and
    means for selectively admitting air pressure to the pressure chamber in order to move the first plate away from the second plate and thereby move the closure member to one of its positions, or exhausting air pressure therefrom to permit the first plate to be moved toward the second plate in order to move the closure member to its other position.

2. An actuator as in claim 1, including spring means for urging the first plate toward the second plate.

3. An actuator as in claim 1, wherein
    the connecting means comprises rods extending sealably through holes in the first plate.

4. As in claim 3, wherein
    the inner end of each hole is enlarged,
    a ring is retained in the inner end of each hole to surround the rod extending through the hole,
    the inner diameter of the ring closely surrounds the rod and the outer diameter of the ring and the rod fit loosely within the inner and outer ends of the hole, respectively, and
    means is provided sealing between the inner diameter of the ring and the rod and the outer diameter of the ring and inner end of the hole.

5. In a valve including a valve body having a flowway therethrough and a closure member reciprocable in the body between positions opening and closing the flowway, an improved pneumatic actuator comprising
    a stem extending sealably into the valve body and having an inner end connected to the closure member for reciprocating it between open and closed positions,
    a first plate connected to the outer end of the stem,
    a rubber tire casing having an inner edge connected to the first plate,
    a second plate disposed outwardly of the first plate and connected to the other inner edge of the casing to form an expandable and contractible pressure chamber within the casing and between the plates,
    means connecting the second plate to the valve body,
    spring means compressed between the first plate and the valve body to urge the first plate toward the second plate, and
    means for selectively admitting air pressure to the pressure chamber in order to move the first plate away from the second plate and thereby move the closure member to one of its position, or exhausting air pressure therefrom to permit the first plate to be moved toward the second plate in order to move the closure member to its other position.

6. In a valve as in claim 5,
    first and second sleeves connected to the first plate and valve body respectively in surrounding relation to the spring means and with their ends arranged telescopically of one another, and
    means about one of the sleeves for indicating the position of the first plate relative to the body and thus the position of the closure member as the other sleeve reciprocates with respect to the one sleeve.

7. In a valve as in claim 5, wherein
    said connecting means includes rods extending through holes in the first plate, and connected at one end to the second plate, and at the other end to the body, means forming a sliding seal between the rods and the first plate to prevent the loss of pressure fluid from the chamber.

8. In a valve as in claim 7, wherein said spring means is compressed between the first plate and the connection of the other ends of the rods to the body, said last mentioned connection including a ring releasably connected to the body and having holes therein each to receive a rod, a seat within each hole, and a nut on the end of each rod holding a shoulder or the rod on the seat, and means preventing rotation of said nuts so that the rods may not be disconnected from the body before disconnection of the ring from the body.

9. In a valve as in claim 8, including a fastener threadedly connecting the outer end of the stem to the first plate, one of said fasteners and outer end of the stem extending sealably through a hole in the first plate, and said fastener being manipulatable from the interior of said chamber.

10. In a valve as in claim 9, wherein the second plate has a hole therein through which air may be injected or released, and a plug for closing the hole, said hole being generally opposite the fasteners to permit access therein upon removal of the plug.

* * * * *